(12) United States Patent
Petrick et al.

(10) Patent No.: US 9,489,281 B2
(45) Date of Patent: Nov. 8, 2016

(54) ACCESS POINT GROUP CONTROLLER FAILURE NOTIFICATION SYSTEM

(71) Applicant: Dell Products L.P., Round Rock, TX (US)

(72) Inventors: Christopher Stephen Petrick, Cedar Park, TX (US); Rabah S. Hamdi, Spring, TX (US)

(73) Assignee: Dell Products L.P., Round Rock, TX (US)

( * ) Notice: Subject to any disclaimer, the term of this patent is extended or adjusted under 35 U.S.C. 154(b) by 162 days.

(21) Appl. No.: 14/558,455

(22) Filed: Dec. 2, 2014

(65) Prior Publication Data

US 2016/0154722 A1 Jun. 2, 2016

(51) Int. Cl.
*G06F 11/00* (2006.01)
*G06F 11/32* (2006.01)
*G06F 11/07* (2006.01)
*G06F 11/20* (2006.01)

(52) U.S. Cl.
CPC ......... *G06F 11/327* (2013.01); *G06F 11/0748* (2013.01); *G06F 11/202* (2013.01); *G06F 11/2028* (2013.01); *G06F 11/0784* (2013.01)

(58) Field of Classification Search
CPC ............. G06F 11/202; G06F 11/2028; G06F 11/0748; G06F 11/0784
See application file for complete search history.

(56) References Cited

U.S. PATENT DOCUMENTS

| | | | | |
|---|---|---|---|---|
| 7,181,642 B1* | 2/2007 | Heideman | ............. | G06F 9/5061 714/11 |
| 7,302,352 B2 | 11/2007 | Chuang | | |
| 7,937,610 B2* | 5/2011 | Hare | ................... | G06F 11/0757 714/4.1 |
| 2005/0080887 A1* | 4/2005 | Lee | ..................... | G06F 11/2025 709/223 |
| 2005/0080891 A1* | 4/2005 | Cauthron | ............ | G06F 11/2023 709/223 |
| 2005/0257213 A1* | 11/2005 | Chu | .................... | G06F 11/2035 717/170 |
| 2007/0064855 A1 | 3/2007 | Yeh | | |
| 2007/0220301 A1* | 9/2007 | Brundridge | ......... | G06F 11/2028 714/4.1 |
| 2008/0134213 A1* | 6/2008 | Alverson | ............ | G06F 11/0709 719/318 |
| 2008/0183339 A1* | 7/2008 | Vaswani | ................ | G01D 4/004 700/297 |
| 2010/0088440 A1* | 4/2010 | Banks | ................. | G06F 11/2028 710/109 |
| 2012/0257603 A1* | 10/2012 | Mercier | ................ | H04W 24/02 370/338 |
| 2013/0128894 A1* | 5/2013 | Shah | ....................... | H04W 8/10 370/401 |
| 2014/0082413 A1* | 3/2014 | Bilich | ................. | G06F 11/2041 714/12 |

OTHER PUBLICATIONS

"Configuring Dying Gasp"; Cisco Systems, Inc. 170 West Tasman Drive, San Jose, CA 95134-1706 USA; Mar. 2012 (Revised Nov. 2012); OL-26940-02; pp. 1-4; http://www.cisco.com/c/en/us/td/docs/routers/connectedgrid/cgr2010/software/15_2_3_t/configuring_dying_gasp.pdf.

"Extending Media Access Networks Over Ethernet: NIMBRA 230 Metro Access Switch"; 2012; Sweden; http://www.netinsight.net/Global/Documents/Products/PDS_Nimbra230.pdf?epslanguage=en.

"High Availability"; Cisco; 2013; pp. 1-9; USA; http://www.cisco.com/c/en/us/products/collateral/wireless/aironet-1130-ag-series/qa_c67-714540.html.

* cited by examiner

*Primary Examiner* — Yolanda L Wilson
(74) *Attorney, Agent, or Firm* — Haynes and Boone, LLP

(57) ABSTRACT

An access point IHS group controller failure notification system includes access point IHSs connected to a network and members of an access point IHS group. A first access point IHS group controller for the access point IHS group is also coupled to the network. The first access point IHS group controller detects a failure issue associated with its imminent failure and, in response, creates an imminent failure message that includes an identifier for the first access point IHS group controller. The imminent failure message may also include timing information that indicates when the first access point IHS group controller will again be available, and/or a second identifier for a second access point IHS group controller that is available for controlling the access point IHS group. The first access point IHS group controller then sends the imminent failure message through the network to each of the plurality of access point IHSs.

20 Claims, 4 Drawing Sheets

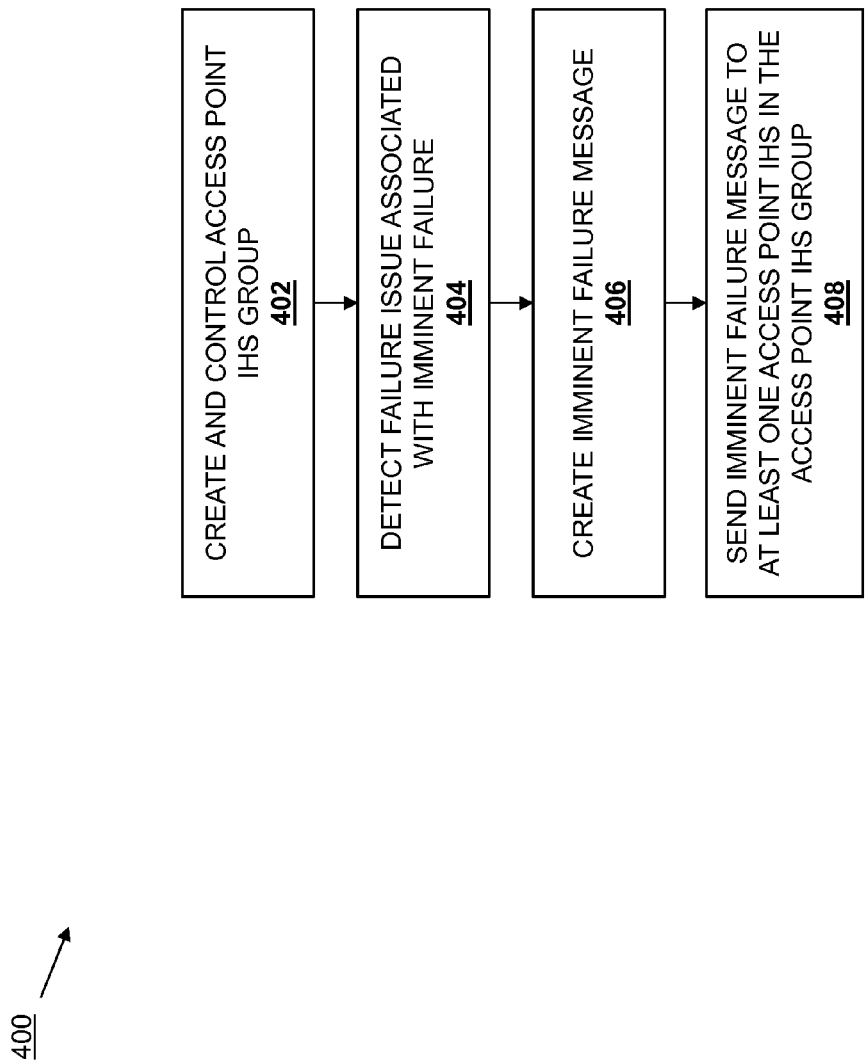

ACCESS POINT GROUP CONTROLLER FAILURE NOTIFICATION SYSTEM

BACKGROUND

The present disclosure relates generally to information handling systems (IHSs), and more particularly to a failure notification system for access point IHS group controllers.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some IHSs include network connectivity and control functionality that allows those IHSs to communicate with other IHSs in order to coordinate into controller groups such that one of the IHSs in the controller group may control at least some functions of the other IHSs in that controller group. For example, wireless access point IHSs allow client devices to connect to a wired network using wireless communication technologies (e.g., WiFi wireless communication technologies), and some wireless access point IHSs may be configured to communicate with each other to form an access point IHS group that provides a client device the ability to access the wired network over a larger physical area than any single access point IHS may provide while only having to provide a single set of access credentials. In such access point IHS groups, an access point IHS group controller may either be provided (e.g., as a dedicated access point IHS group controller or as an access point IHS with controller functionality) to perform control functionality for the group. The failure of such access point IHS group controllers raises a number of issues.

For example, in conventional access point IHS group systems, when the access point IHS group controller fails, the access point IHSs in that access point IHS group are unaware of that failure and will continue to attempt to communicate with the failed access point IHS group controller for some predetermined amount of time before assuming that that access point IHS group controller has failed. Following that predetermined amount of time, each access point IHS in the access point IHS group will then communicate with other access point IHSs in the access point IHS group to attempt to locate another access point IHS group controller. As such, following the failure of an access point IHS group controller of an access point IHS group, each of the access point IHSs in that access point IHS group will spend a relatively significant amount of time attempting to communicate with the failed access point IHS group controller. During that time, controller functionality is lost, which can result in an inability to authenticate client devices, allocate Internet Protocol Addresses, manage client devices, and/or provide client devices access to the network.

Accordingly, it would be desirable to provide a failure notification system for access point IHS group controllers.

SUMMARY

According to one embodiment, an information handling system (IHS), includes a chassis that houses a plurality of IHS components that provide a first access point IHS group controller that controls an access point IHS group; a network interface that is located in the chassis and that is configured to couple to a network; a processing system that is located in the chassis and that is coupled to the network interface; and a memory system that is located in the chassis, coupled to the processing system, and that includes instructions that, when executed by the processing system, cause the processing system to provide an access point IHS group controller failure notification engine that is configured to: detect a failure issue associated with an imminent failure of at least one of the plurality of IHS components that provide the first access point IHS group controller; create an imminent failure message that includes a first access point IHS group controller identifier for the first access point IHS group controller; and send the imminent failure message through network interface to at least one access point IHS that is coupled to the network and that is a member of the access point IHS group.

BRIEF DESCRIPTION OF THE DRAWINGS

FIG. 4 is a flow chart illustrating an embodiment of an access point IHS group controller failure notification method.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
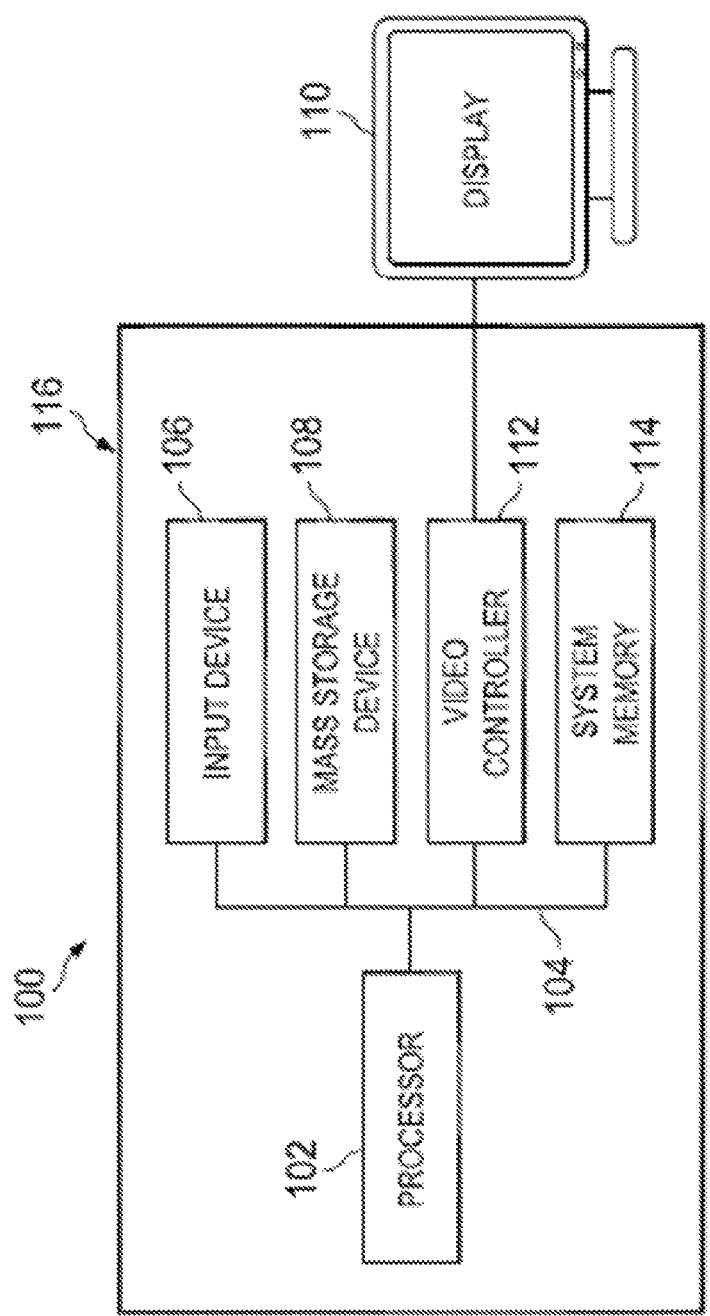
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
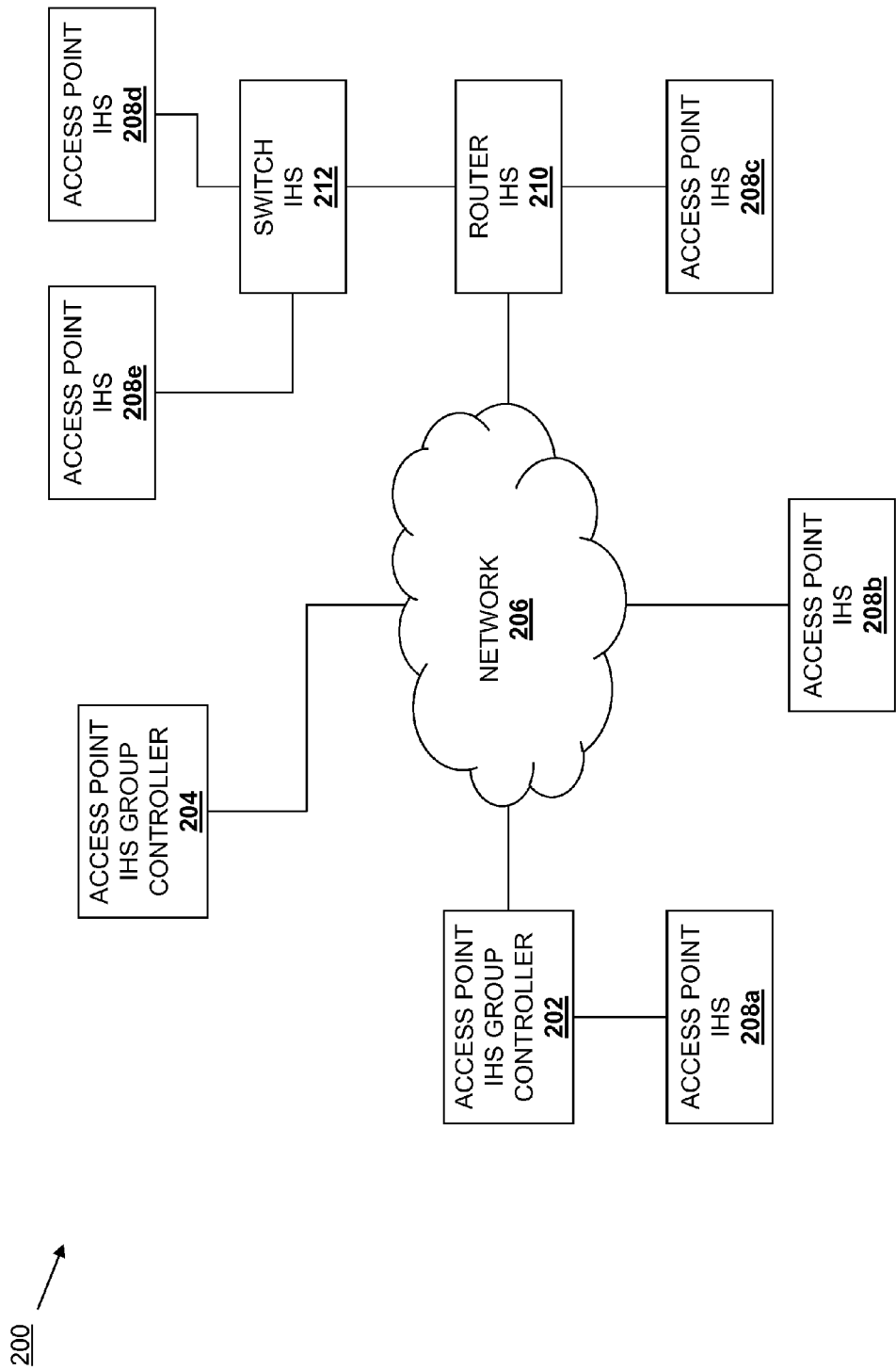
FIG. 2 is a schematic view illustrating an embodiment of an access point IHS group controller failure notification system.

Referring now to FIG. 2, an embodiment of a controller failure notification system that, in the specific example provided below is an access point IHS group controller failure notification system 200, is illustrated. The access point IHS group controller failure notification system 200 includes a first access point IHS group controller 202 and a second access point IHS group controller 204 that may each be the IHS 100 discussed above with reference to FIG. 1 and/or that may include some or all of the components of the IHS 100. For example, the access point IHS group controllers 202 and/or 204 may be dedicated virtual controller IHSs that are configured to control virtual controller groups, or may be access point IHSs that include virtual controller functionality that allows those access point IHSs to control virtual controller groups. In other examples, the access point IHS group controllers 202 and/or 204 may be dedicated controller IHSs that are configured to control controller groups, or may be access point IHSs that include controller functionality that allows those access point IHSs to control controller groups. In the example below, the first access point IHS group controller 202 operates as a virtual controller to control an access point IHS group/virtual controller group prior to a failure issue, while the second access point IHS group controller 204 provides a backup virtual controller that is not controlling an access point IHS group/virtual controller group prior to the failure issue with the first access point IHS group controller 202. However, the second access point IHS group controller 204 may operate as a virtual controller to control an access point IHS group/virtual controller group prior to the failure issue with the first access point IHS group controller 202 while remaining within the scope of the present disclosure. Furthermore, additional access point IHS group controllers may be included in the access point IHS group controller failure notification system 200 while remaining within the scope of the present disclosure.

Each of the first access point IHS group controller 202 and the second access point IHS group controller 204 are coupled to a network 206 (e.g., a Local Area Network (LAN), the Internet, etc.) that is coupled to a plurality of access point IHSs 208a, 208b, 208c, 208d, and 208e. In an embodiment, any or all of the plurality of access point IHS 208a-e may be the IHS 100 discussed above with reference to FIG. 1, and/or may include some or all of the components of the IHS 100. In the illustrated embodiment, the access point IHS 208a is coupled directly to the first access point IHS group controller 202 (e.g., via a direct connection between network interfaces on the access point IHS 208a and the first access point IHS group controller 202), the access point IHS 208b is coupled directly to the network 206, the access point IHS 208c is coupled to the network 206 through a router IHS 210 (which may be the IHS 100 discussed above with reference to FIG. 1 and/or which may include some or all of the components of the IHS 100), and the access point IHSs 208e and 208d are coupled to the network 204 through a switch IHS 212 (which may be the IHS 100 discussed above with reference to FIG. 1 and/or which may include some or all of the components of the IHS 100) that is coupled to the router IHS 210. While only five access point IHSs are illustrated in the access point IHS group controller failure notification system 200, one of skill in the art in possession of the present disclosure will recognize that any number of access point IHSs may be included in the access point IHS group controller failure notification system 200 while remaining within the scope of the present disclosure.

Figure 3:
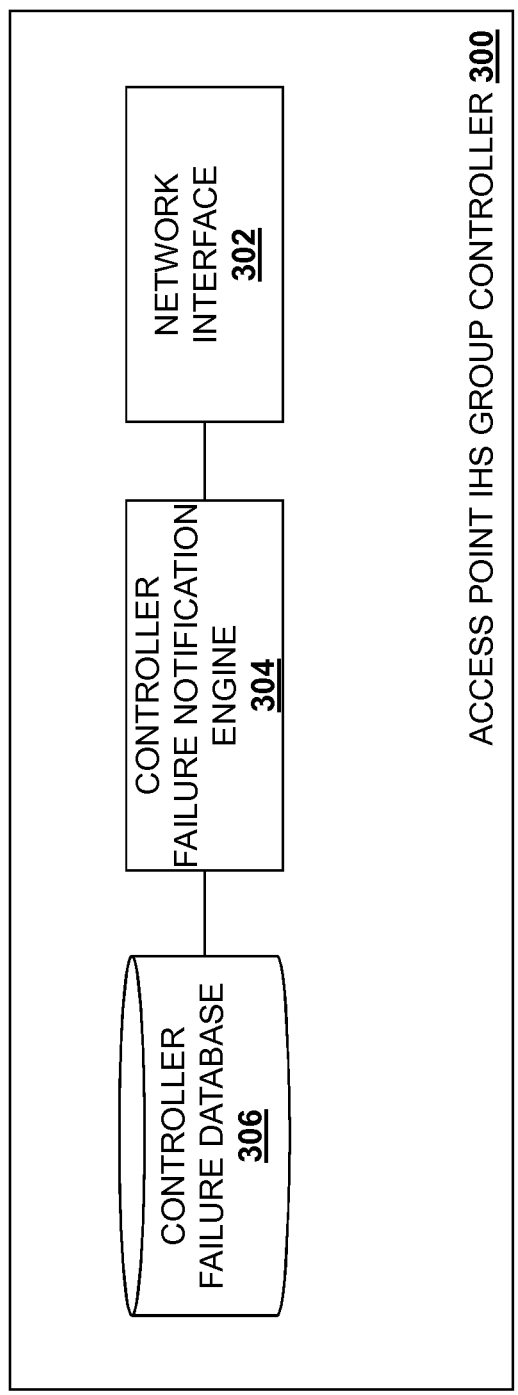
FIG. 3 is a schematic view illustrating an embodiment of an access point IHS group controller.

Referring now to FIG. 3, an embodiment of an access point IHS group controller 300 is illustrated that may be, for example, the first access point IHS group controller 202 and/or the second access point IHS group controller 204 discussed above. The access point IHS group controller 300 includes a network interface 302 (e.g., a Network Interface Controller (NIC)) that is configured to couple to a network. The access point IHS group controller 300 also includes a processing system (not illustrated, but which may be the processor 102 discussed above with reference to FIG. 1) and a memory system (not illustrated, but which may be the system memory 114 discussed above with reference to FIG. 1) that includes instructions that, when executed by the processing system, cause the processing system to provide a controller failure notification engine 304 that operates to perform the functions of the controller failure engines and access point IHS group controllers discussed below. The controller failure notification engine 304 is coupled (e.g., via a coupling to the processing system) to a controller failure database 306 that may be provided using a non-transitory memory or storage device. In the examples below, the controller failure notification engine 304 is discussed primarily as performing controller failure notifications functions, but one of skill in the art will recognize that the access point IHS group controller 300 may include a plurality of IHS components that operate to provide the controller failure notification engine 304 and/or other engines to perform control functions for virtual controller group IHSs in a virtual controller group. In the examples provided below, those virtual controller group IHSs are illustrated and described as access point IHSs that allow wireless devices to connect to a wired network using wireless communication technologies (e.g., WiFi wireless communication technologies). However, the systems and methods described herein will be beneficial for any network-connected devices that include group controller functionality such as, for example, Software Defined Network (SDN) controllers and/or a variety of other group controller systems known in the art, and thus the application of the systems and methods taught herein to such devices and systems will fall within the scope of the present disclosure.

Referring now to FIG. 4, an embodiment of an access point IHS group controller failure notification method 400 is illustrated. As discussed in further detail below, the systems and methods of the present disclosure provide an access point IHS group controller that is configured to determine that it is going to experience an imminent failure that will result in its inability to control an access point IHS group and, in response, send an imminent failure message to the plurality of access point IHSs in that access point IHS group that allows those access point IHSs to significantly reduce the amount of time they are without control functionality relative to conventional systems. As discussed above, when the access point IHS group controller in a conventional access point IHS group system fails, the access point IHSs in that access point IHS group will be unaware of that failure and will continue to attempt to communicate with the failed access point IHS group controller for a relatively significant amount of time before determining that that access point IHS group controller has failed, and during that time controller functionality is lost, which can result in an inability to authenticate client devices, allocate Internet Protocol Addresses, manage client devices, and/or provide client devices access to the network.

The method 400 begins at block 402 where an access point IHS group is created and controlled. In an embodiment, the first access point IHS group controller 202 may exchange communications with the access point IHSs 208a, 208b, 208c, 208d, and/or 208e (upon the access point IHSs booting) that allow the access point IHSs 208a, 208b, 208c, 208d, and/or 208e to register, configure, and/or perform any other functions known in the art to create an access point IHS group that is controlled by the first access point IHS group controller 202. Following the creation of the access point IHS group, the access point IHSs 208a-e may act as gateways to the network 206 while the first access point IHS group controller 202 controls the access point IHS group by authenticating client devices that connect to the access point IHSs 208a-e, allocating Internet Protocol (IP) addresses to the access point IHSs 208a-e and/or their connected client devices, managing client devices connected to the access point IHSs 208a-e, providing network access to the network for client devices connected to the access point IHSs 208a-e, and/or performing any other control functionality known in the art.

The method 400 then proceeds to block 404 where a failure issue associated with an imminent failure is detected. In an embodiment, the first access point IHS group controller 202 detects a failure issue that is associated with the imminent failure of the first access point IHS group controller 202. As discussed below, the failure issue may be detected when an operating parameter of the first access point IHS group controller 202 is outside of a predetermined range that indicates that the first access point IHS group controller 202 will be unable to provide at least some control functionality for the access point IHS group following a relatively short period of time that one of skill in the art in possession of the present disclosure will understand may vary depending on the system.

For example, that relatively short period of time may range from fractions of a second (e.g., a minimum amount of time needed to send the imminent failure message discussed below, an amount of time that is insufficient to send the imminent failure message discussed below without some auxiliary power source, etc.) to periods between 1 and 10 seconds depending on the system. In some embodiments, the time range associated with the relatively short period of time may be configured by the manually by the user. In other embodiments, the time range associated with the relatively short period of time may be automatically adjusted by the access point IHS controller based on the hardware configuration of the access point IHS controller that may include, for example, the types and number of power supplies, the types and numbers of fans, the number and types of access points connected to the access point IHS controller, the current and/or average power supply usage over time, the current and/or average hardware temperature readings over time, the type of traffic data travelling through the access point IHS controller system, the subscriber devices and/or users connected to the access point IHS controller system via the access points, and/or a variety of other hardware configuration characteristics known in the art. While a number of examples of failures issues associated with an imminent failure are provided below, those examples are not meant to be limiting, and one of skill in the art will recognize that other failure issues associated with an imminent failure will fall within the scope of the present disclosure.

In one embodiment of block 404, the failure issue is detected in response to the first access point IHS group controller 202 determining that a power amount provided by a power source (not illustrated) to the first access point IHS group controller 202 and/or its components is outside of a predetermined power range. For example, the controller failure database 306 may include one or more predetermined power ranges that are indicative of normal power amounts received during normal operation of the first access point IHS group controller 202, and at block 404 the first access point IHS group controller 202 may monitor the power amount provided to the first access point IHS group controller 202 and/or one or more of its components to determine whether that power amount is outside of the predetermined power range(s) in the controller failure database 306. As such, at block 404, the first access point IHS group controller 202 may determine that a power amount provided to the first access point IHS group controller 202 or one of its components is below (or about to decrease below) a power amount that is necessary to sufficiently power the first access point IHS group controller 202 or one of its components such that failure (e.g., insufficient power to perform at least some control functionality for the access point IHS group) is imminent. Similarly, at block 404, the first access point IHS group controller 202 may determine that a power amount provided to the first access point IHS group controller 202 or one of its components is above (or is about to increase above) a power amount that the first access point IHS group controller 202 or one of its components is capable of handling such that failure (e.g., component damage that prevents the performance at least some control functionality for the access point IHS group) is imminent. As such, predetermined power ranges may be directed to an input power received by the first access point IHS group controller 202 and/or input power received by one or more components in the first access point IHS group controller 202 (e.g., a power supply unit, a processing system, etc.), and may be used to detect failure issues associated with the first access point IHS group controller 202 receiving too much or too little power as a result of, for example, a failing power supply.

In another embodiment of block 404, the failure issue is detected in response to the first access point IHS group controller 202 determining that a temperature of the first access point IHS group controller 202 and/or its components is outside of a predetermined temperature range. For example, the controller failure database 306 may include one or more predetermined temperature ranges that are indicative of normal operating temperatures of the first access point IHS group controller 202, and at block 404 the first access point IHS group controller 202 may monitor the temperature of the first access point IHS group controller 202 and/or one or more of its components to determine whether that temperature is outside of the predetermined temperature range(s) in the controller failure database 306. As such, at block 404, the first access point IHS group controller 202 may determine that a temperature of the first access point IHS group controller 202 or one of its components is below (or is about to decrease below) a temperature that will affect the operation of the first access point IHS group controller 202 or one of its components such that failure (e.g., inability to perform at least some control functionality for the access point IHS group due to low temperature) is imminent. Similarly, at block 404, the first access point IHS group controller 202 may determine that a temperature of the first access point IHS group controller 202 or one of its components is above (or about to increase above) a temperature that the first access point IHS group controller 202 or one of its components is capable of handling such that failure (e.g., inability to perform at least some control functionality for the access point IHS group due to high temperature) is imminent. As such, predetermined temperature ranges may be directed to temperatures experienced by the first access point IHS group controller 202 and/or one or more components in the first access point IHS group controller 202 (e.g., a processing system, a memory system, etc.), and may be used to detect failure issues associated with the first access point IHS group controller 202 experiencing extreme temperatures as a result of, for example, a failing thermal control system.

In another embodiment of block 404, the failure issue is detected in response to the first access point IHS group controller 202 determining that a signal quality of the first access point IHS group controller 202 and/or its components is outside of a predetermined signal quality range. For example, the controller failure database 306 may include one or more predetermined signal quality ranges that are indicative of a minimum uplink and/or downlink signal quality for the first access point IHS group controller 202, and at block 404 the first access point IHS group controller 202 may monitor the signal quality of the first access point IHS group controller 202 and/or one or more of its components to determine whether that signal quality is outside of the predetermined signal quality range(s) in the controller failure database 306. As such, at block 404, the first access point IHS group controller 202 may determine that an uplink signal quality of the first access point IHS group controller 202 or one of its components is below (or is about to decrease below) a signal quality that will affect the operation of the first access point IHS group controller 202 or one of its components such that failure (e.g., inability to perform at least some control functionality for the access point IHS group due to degraded uplink signal quality) is imminent. Similarly, at block 404, the first access point IHS group controller 202 may determine that a downlink signal quality of the first access point IHS group controller 202 or one of its components is below (or is about to decrease below) a signal quality that will affect the operation of the first access point IHS group controller 202 or one of its components such that failure (e.g., inability to perform at least some control functionality for the access point IHS group due to degraded downlink signal quality) is imminent. As such, predetermined signal quality ranges may be directed to signal qualities experienced by the first access point IHS group controller 202 and/or one or more components in the first access point IHS group controller 202 (e.g., an uplink port, a downlink port, etc.), and may be used to detect failure issues associated with the first access point IHS group controller 202 not being able to communicate due to degraded signal quality on a communication channel.

In another embodiment of block 404, the failure issue is detected in response to the first access point IHS group controller 202 determining that a hardware resource parameter of the first access point IHS group controller 202 and/or its components is outside of a predetermined hardware resource parameter range. For example, the controller failure database 306 may include one or more predetermined hardware resource parameter ranges that are indicative of hardware resource parameters for hardware resources in the first access point IHS group controller 202, and at block 404 the first access point IHS group controller 202 may monitor the hardware resource parameters of the hardware resources in the first access point IHS group controller 202 and/or one or more of its components to determine whether any of those hardware resource parameters are outside of the predetermined hardware resource parameter range(s) in the controller failure database 306. As such, at block 404, the first access point IHS group controller 202 may determine that a hardware resource parameter of the first access point IHS group controller 202 or one of its components is outside (or is about to begin operating outside) a hardware resource parameter range that will affect the operation of the first access point IHS group controller 202 or one of its components such that failure (e.g., inability to perform at least some control functionality for the access point IHS group due to corruption of the memory system in the access point IHS group controller 202, reduced capability of the memory system in the access point IHS group controller 202, overuse of the processing system in the access point IHS group controller 202, etc.) is imminent. As such, predetermined hardware resource parameter ranges may be directed to hardware resources in the first access point IHS group controller 202 and/or one or more components in the first access point IHS group controller 202 (e.g., the memory system, the processing system, etc.), and may be used to detect failure issues associated with the inability (or reduced ability) of the first access point IHS group controller 202 to operate due to degraded hardware resources.

In another embodiment of block 404, the failure issue is detected in response to the first access point IHS group controller 202 determining that a software resource parameter of the first access point IHS group controller 202 and/or its components is outside of a predetermined software resource parameter range. For example, the controller failure database 306 may include one or more predetermined software resource parameter ranges that are indicative of software resource parameters for software resources in the first access point IHS group controller 202, and at block 404 the first access point IHS group controller 202 may monitor the software resource parameters of the software resources in the first access point IHS group controller 202 and/or one or more of its components to determine whether any of those software resource parameters are outside of the predetermined software resource parameter range(s) in the controller failure database 306. As such, at block 404, the first access point IHS group controller 202 may determine that a software resource parameter of the first access point IHS group controller 202 or one of its components is outside (or is about to begin operating outside) a software resource parameter range that will affect the operation of the first access point IHS group controller 202 or one of its components such that failure (e.g., inability to perform at least some control functionality for the access point IHS group due to an operating system shutdown, an application failure, basic input output system (BIOS) corruption, etc.) is imminent. As such, predetermined software resource parameter ranges may be directed to software resources in the first access point IHS group controller 202 and/or one or more components in the first access point IHS group controller 202 (e.g., the operating system, an application, the BIOS, etc.), and may be used to detect failure issues associated with the inability (or reduced ability) of the first access point IHS group controller 202 to operate due to degraded software resources.

Thus, the failure issue detected at block 404 may include a variety of failure issues that will result in an imminent failure that prevents the first access point IHS group controller from performing at least some control functionality for the access point IHS group. In addition to the failure issues expressly detailed above, a wide variety of other failure issues will fall within the scope of the present disclosure, including user-defined shutdown ranges that include user-defined parameters that indicate when the first access point IHS group controller 202 is operating at a user-defined sub-par level, when the first access point IHS group controller 202 is about to experience a software upgrade such that it will be unavailable for some period of time, etc. Furthermore, failures of the operating system in the access point IHS group controller, configuration changes to the access point IHS group controller that inhibit the access point IHS group controller from performing its controller functions, and/or a variety of other failures issues will fall within the scope of the present disclosure.

The method 400 then proceeds to block 406 where an imminent failure message is created. In some embodiments, the imminent failure message is created by the first access point IHS group controller 202 in response to detecting the failure issue at block 404. In some embodiments, the imminent failure message may have been at least partially created by the first access point IHS group controller 202 prior to detecting the failure issue at block 404. As such, in some embodiments block 406 may be performed prior to block 404, while in some embodiments block 406 may be at least partially performed subsequent to block 404. For example, the imminent failure message may be entirely created prior to detecting the failure issue at block 404. In another example, the imminent failure message may be partially created prior to detecting the failure issue at block 404, and then completed subsequent to detecting the failure issue at block 404. In yet another example, the imminent failure message may be entirely created subsequent to detecting the failure issue at block 404.

The imminent failure message created at block 406 includes an indication that the failure of the first access point IHS group controller 202 is imminent such as, for example, a "virtual controller down" message, a "controller down" message, and/or other failure indications known in the art. In an embodiment, the imminent failure message created at block 406 also includes a first identifier for the first access point IHS group controller 202. For example, the first identifier for the first access point IHS group controller 202 may include an Internet Protocol (IP) address for the first access point IHS group controller 202, a Media Access Control (MAC) address for the first access point IHS group controller 202, and/or a variety of other IHS identifiers known in the art. One example of the performance of block 406 to entirely create the imminent failure message prior to block 404 may include an imminent failure message that only includes the imminent failure indication and the identifier for the first access point IHS group controller 202 (i.e., information available prior to detecting the failure issue at block 404), although such an example may include other information that is available prior to detecting the failure issue at block 404.

In an embodiment, the imminent failure message created at block 406 also includes a timing information that is indicative of a time period when the first access point IHS group controller 202 will be available subsequent to the imminent failure. For example, at block 406 the first access point IHS group controller 202 may operate to predict, estimate, or otherwise determine a time period following the its imminent failure when it will again be available to perform control functions for the access point IHS group. The time period may be predicted based on the failure issue detected at block 404 (e.g., imminent failures due to reset, software upgrades, exceeded temperature ranges, degraded hardware or software resources, and/or other failure issues may be associated with expected recovery time periods after which the first access point IHS group controller 202 will again be available to perform control functions for the access point IHS group), and timing information that is indicative of that time period may be included in the imminent failure message created at block 406. One example of the performance of block 406 to create the imminent failure message (at least in part) subsequent to block 404 may include an imminent failure message that includes the timing information that is indicative of the time period when the first access point IHS group controller 202 will be available subsequent to the imminent failure and that may be determined subsequent to the detection of the failure issue at block 404. However, in some examples the first access point IHS group controller 202 may create and store a plurality of different imminent failure messages prior to block 404 that include different predetermined timing information for different known failure issues.

In an embodiment, the imminent failure message created at block 406 also includes a second identifier for the second access point IHS group controller 204. For example, the second identifier for the second access point IHS group controller 202 may include an Internet Protocol (IP) address for the second access point IHS group controller 202, a Media Access Control (MAC) address for the second access point IHS group controller 202, and/or a variety of other IHS identifiers known in the art. In addition, the imminent failure message may include any other information needed for the access point IHSs to redirect to the second access point IHS group controller 204 as their new access point IHS group controller. For example, at block 406 the first access point IHS group controller 202 may operate to determine that the second access point IHS group controller 204 is coupled to the network 206 and available for controlling the access point IHS group, and may retrieve the second identifier from the second access point IHS group controller 204 and include that second identifier in the imminent failure message created at block 406. One example of the performance of block 406 to create the imminent failure message (at least in part) subsequent to block 404 may include an imminent failure message that includes the second identifier for the second access point IHS group controller 204 that may be retrieved, looked up, or determined subsequent to the detection of the failure issue at block 404. However, in some examples the first access point IHS group controller 202 may create and store a plurality of different imminent failure messages prior to block 404 that include second identifiers for different second access point IHS group controllers that are coupled to the network 206 and that would be available for controlling the access point IHS group if the first access point IHS group controller 202 failed.

Thus, at block 406 an imminent failure message may be created that may include a variety of information that indicates that a failure of the virtual controller imminent, that identifies the virtual controller that is about to fail, that predicts a time period after which that virtual controller will again be available, and/or that identifies another virtual controller that is available for controlling the virtual controller group. While several examples have been provided, one of skill in the art in possession of the present disclosure will recognize that any of a variety of failure information, virtual controller group information, virtual controller information, access point IHS information, and/or other information may be included in the imminent failure message while remaining within the scope of the present disclosure. In addition, the imminent failure message may include a hierarchy of information that may be included depending on how imminent (e.g., the amount of time until) the failure, and thus some failure issues may allow more information to be included in the imminent failure message than others.

The method 400 then proceeds to block 408 where the imminent failure message is sent to at least one access point IHS in the access point IHS group. In an embodiment, at block 408 the first access point IHS group controller 202 sends the imminent failure message created at block 406 over the network to at least one of the access point IHSs 208a-e in the access point IHS group. For example, the first access point IHS group controller may broadcast the imminent failure message to each of the access point IHSs 208a-e in the access point IHS group. The broadcasting of the imminent failure message to each of the access point IHSs 208a-e in the access point IHS group may be utilized when the first access point IHS group controller 202 experiences a failure issue that will prevent the first access point IHS group controller 202 from performing control functions for any of the access point IHSs 208a-e in the access point IHS group. For example, a failure issue such as a loss of power to the access point IHS group controller 202 may result in the broadcast of the imminent failure message to each of the access point IHSs 208a-e in the access point IHS group.

In another example, the first access point IHS group controller 202 may send the imminent failure message to a subset of the access point IHSs 208a-e in the access point IHS group (e.g., a single one of the access point IHSs 208a-e, some plurality of the access point IHSs 208a-e that does not include all of the access point IHSs in the access point IHS group, etc.). The sending of the imminent failure message to some subset of the access point IHSs 208a-e in the access point IHS group may be utilized when the first access point IHS group controller 202 experiences a failure issue that will prevent the first access point IHS group controller 202 from performing control functions for only that subset of the access point IHSs 208a-e in the access point IHS group. For example, a failure issue such as signal degradation on a port or subset of ports on the access point IHS group controller 202 may result in the sending of the imminent failure message to only the access point IHSs 208a-e in the access point IHS group that are connected to those ports.

In some embodiments, the first access point IHS group controller 202 may use the failure issue detected at block 404 to determine a time period available to send the imminent failure message prior to the imminent failure of the first access point IHS group controller 202, and send the imminent failure message at block 408 prior to the expiration of that time period. In some embodiments, the first access point IHS group controller 202 may include components that allow for the sending of the imminent failure message at block 408 subsequent to the imminent failure that prevents the first access point IHS group controller 202 from performing control functions for the access point IHS group. For example, for failure issues such as degrading power supply, the first access point IHS group controller 202 may include a battery, capacitor, or other power storage device that may be utilized to allow for the sending of the imminent failure message subsequent to a loss of power that prevents the first access point IHS group controller 202 from performing control functions for the access point IHS group.

Subsequent to the sending of the imminent failure message by the first access point IHS group controller 202 at block 408, the access point IHSs 208a-e and/or other components in the access point IHS group controller failure notification system 200 may utilize the imminent failure message to perform a variety of different actions. For example, any or all of the access point IHSs 208a-e in the access point IHS group that receive the imminent failure message may, in response, immediately begin communicating with each other to elect one of those access point IHSs (that includes at least some virtual controller functionality) as the new access point IHS group controller of the access point IHS group. Thus, the imminent failure message sent at block 408 may cause the access point IHSs 208a-e in the access point IHS group to elect a new access point IHS group controller, register with that new access point IHS group controller (or register those access point IHSs), and receive (or send) control commands for the access point IHS group. In some embodiments, access point IHSs (e.g., the access point IHS 208a) directly connected to the failed access point IHS group controller (e.g., the access point IHS group controller 202) may be provided a pass-through connection to the network 206 that is operable when that access point IHS group controller fails such that that access point IHS may access the network 206 to communicate with the other access point IHSs subsequent to the failure of the access point IHS group controller.

In another example, any or all of the access point IHSs 208a-e in the access point IHS group may receive the imminent failure message that includes the timing information that is indicative of a time period when the first access point IHS group controller will be available subsequent to the imminent failure and, in response, wait for the time period and then contact the first access point IHS group controller following the time period to attempt to receive control commands for the access point IHS group. Thus, the imminent failure message sent at block 408 may cause the access point IHSs 208a-e in the access point IHS group to wait for the access point IHS group controller 202 to again become available so that those access point IHSs 208a-e may again receive (or send) control commands for the access point IHS group. In some embodiments, any or all of the access point IHs 208a-e may use the timing information to determine whether to wait for the availability of the first access point IHS group controller or attempt to join a new access point IHS group controlled by a different access point IHS group controller (e.g., depending on the length of the time period indicated by the timing information, the need for control functionality during that time period, and/or any other information associated with control functionality performed by a virtual controller known in the art).

In another example, any or all of the access point IHSs 208a-e in the access point IHS group may receive the imminent failure message that includes the second identifier for the second access point IHS group controller 204 and, in response, immediately communicate with the second access point IHS group controller 204 using the second identifier to attempt to join a new access point IHS group controlled by the second access point IHS group controller 204. Thus, the imminent failure message sent at block 408 may cause the access point IHSs 208a-e in the access point IHS group to contact a new access point IHS group controller identified in the imminent failure message, register with that new access point IHS group controller, and receive control commands from that new access point IHS group controller for the new access point IHS group.

In another example, the second access point IHS group controller 204 may receive the imminent failure message and, in response, broadcast an access point IHS group invitation message to the plurality of access point IHSs 208a-e that includes a second identifier for the second access point IHS group controller 204, along with information to join a new access point IHS group controlled by the second access point IHS group controller 204. Thus, the imminent failure message sent at block 408 may cause a new access point IHS group controller to contact the access point IHSs 208a-e in the access point IHS group that had its access point IHS group controller fail such that those access point IHSs may register with that new access point IHS group controller and receive control commands from that new access point IHS group controller for the new access point IHS group.

Thus, systems and methods have been described that provide for the notification of a virtual controller failure to IHSs in a virtual controller group such that those IHSs may immediately elect a new virtual controller, wait for the failed virtual controller to again become available, immediately connect to a new virtual controller identified in the notification, and/or immediately connect to a new virtual controller that identifies itself in response to receiving the notification. The systems and methods of the present disclosure substantially improve upon the failover response of conventional virtual controller group systems by providing a virtual controller that sends a "dying gasp" message upon detection of a situation that will imminently cause the virtual controller to fail, along with providing IHSs in the virtual controller group that may immediately respond to that dying gasp message by finding and/or registering with a new virtual controller such that control functionality for the virtual controller group is not lost for any significant amount of time.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An access point information handling system (IHS) group controller failure notification system, comprising:
   a network;
   a plurality of access point IHSs that are coupled to the network and that are members of an access point IHS group; and
   a first access point IHS group controller for the access point IHS group, wherein the first access point IHS group controller is coupled to the network and configured to:
      detect a failure issue associated with an imminent failure of the first access point IHS group controller;
      create an imminent failure message that includes a first identifier for the first access point IHS group controller; and
      send the imminent failure message through the network to each of the plurality of access point IHSs.

2. The access point IHS group controller failure notification system of claim 1, wherein the imminent failure message includes timing information indicative of a time period when the first access point IHS group controller will be available subsequent to the imminent failure.

3. The access point IHS group controller failure notification system of claim 2, wherein each of the plurality of access point IHSs is configured to:
   receive the imminent failure message; and
   contact the first access point IHS group controller following the time period.

4. The access point IHS group controller failure notification system of claim 1, wherein the imminent failure message includes a second identifier for a second access point IHS group controller that is coupled to the network and that is available for controlling the access point IHS group.

5. The access point IHS group controller failure notification system of claim 4, wherein each of the plurality of access point IHSs is configured to:
   receive the imminent failure message; and
   contact the second access point IHS group controller using the second identifier.

6. The access point IHS group controller failure notification system of claim 1, wherein each of the plurality of access point IHSs is configured to:
   receive the imminent failure message; and
   communicate with the others of the plurality of access point IHSs to elect a second access point IHS group controller.

7. The access point IHS group controller failure notification system of claim 1, further comprising:
   a second access point IHS group controller that is coupled to the network, wherein the second access point IHS group controller is configured to:
      receive the imminent failure message; and
      broadcast a second identifier for the second access point IHS group controller to each of the plurality of access point IHSs.

8. An information handling system (IHS), comprising:
   a chassis that houses a plurality of IHS components that provide a first access point IHS group controller that controls an access point IHS group;
   a network interface that is located in the chassis and that is configured to couple to a network;
   a processing system that is located in the chassis and that is coupled to the network interface; and
   a memory system that is located in the chassis, coupled to the processing system, and that includes instructions that, when executed by the processing system, cause the processing system to provide an access point IHS group controller failure notification engine that is configured to:
      detect a failure issue associated with an imminent failure of at least one of the plurality of IHS components that provide the first access point IHS group controller;
      create an imminent failure message that includes a first access point IHS group controller identifier for the first access point IHS group controller; and send the imminent failure message through network interface to at least one access point IHS that is coupled to the network and that is a member of the access point IHS group.

9. The IHS of claim 8, wherein the access point IHS group controller failure notification engine is configured to:
   determine timing information indicative of a time period when the first access point IHS group controller will be available subsequent to the imminent failure; and
   include the timing information in the imminent failure message.

10. The IHS of claim 8, wherein the access point IHS group controller failure notification engine is configured to:
    determine a second identifier for a second access point IHS group controller that is coupled to the network and that is available for controlling the access point IHS group; and
    include the second identifier in the imminent failure message.

11. The IHS of claim 8, wherein the access point IHS group controller failure notification engine is configured to:
    detect the failure issue by determining a power amount provided to the at least one of the plurality of IHS components is outside of a predetermined power range.

12. The IHS of claim 8, wherein the access point IHS group controller failure notification engine is configured to:
    detect the failure issue by determining that the at least one of the plurality of IHS components includes a temperature that is outside of a predetermined temperature range.

13. The IHS of claim 8, wherein the access point IHS group controller failure notification engine is configured to:
    detect the failure issue by determining that the at least one of the plurality of IHS components includes a signal quality that is outside of a predetermined signal quality range.

14. The IHS of claim 8, wherein the access point IHS group controller failure notification engine is configured to:
    detect the failure issue by determining that the at least one of the plurality of IHS components includes a hardware resource parameter that is outside of a predetermined hardware resource parameter range.

15. An access point information handling system (IHS) group controller failure notification method, comprising:
    controlling, by a first access point IHS group controller through a network, an access point IHS group that includes a plurality of access point IHSs;
    detecting, by the first access point IHS group controller, a failure issue associated with an imminent failure of the first access point IHS group controller;
    creating, by the first access point IHS group controller, an imminent failure message that includes a first identifier for the first access point IHS group controller; and
    sending, by the first access point IHS group controller, the imminent failure message through the network to each of the plurality of access point IHSs.

16. The access point IHS group controller failure notification method of claim 15, further comprising:
    determining, by the first access point IHS group controller, timing information indicative of a time period when the first access point IHS group controller will be available subsequent to the imminent failure; and
    including, by the first access point IHS group controller, the timing information in the imminent failure message.

17. The access point IHS group controller failure notification method of claim 16, further comprising:
    receiving, by at least one of the plurality of access point IHSs, the imminent failure message; and
    contacting, by the at least one of the plurality of access point IHSs, the first access point IHS group controller following the time period.

18. The access point IHS group controller failure notification method of claim 15, further comprising:
    determining, by the first access point IHS group controller, a second identifier for a second access point IHS group controller that is coupled to the network and that is available for controlling the access point IHS group; and
    including, by the first access point IHS group controller, the second identifier in the imminent failure message.

19. The access point IHS group controller failure notification method of claim 18, further comprising:
    receiving, by at least one of the plurality of access point IHSs, the imminent failure message; and
    contacting, by the at least one of the plurality of access point IHSs, the second access point IHS group controller using the second identifier.

20. The access point IHS group controller failure notification method of claim 15, further comprising:
    receiving, by a second access point IHS group controller through the network, the imminent failure message; and
    broadcasting, by the second access point IHS group controller through the network, a second identifier for the second access point IHS group controller to each of the plurality of access point IHSs.

* * * * *